Jan. 19, 1965 R. T. HEARN 3,166,108
AUTOMATIC SHUTOFF DEVICE
Filed July 18, 1961 3 Sheets-Sheet 1

INVENTOR
Robert Thomas Hearn
BY Connolly and Hutz
ATTORNEYS

Jan. 19, 1965    R. T. HEARN    3,166,108
AUTOMATIC SHUTOFF DEVICE
Filed July 18, 1961    3 Sheets-Sheet 2

INVENTOR
Robert Thomas Hearn
BY Connolly and Hutz
ATTORNEYS

Jan. 19, 1965
R. T. HEARN
3,166,108
AUTOMATIC SHUTOFF DEVICE
Filed July 18, 1961
3 Sheets-Sheet 3
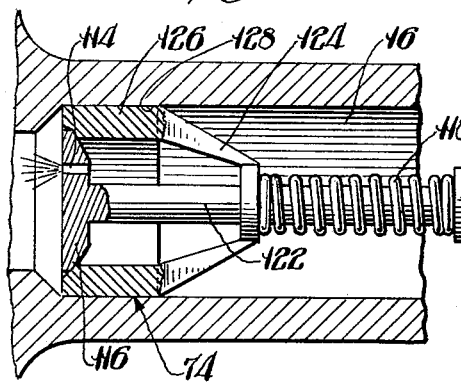
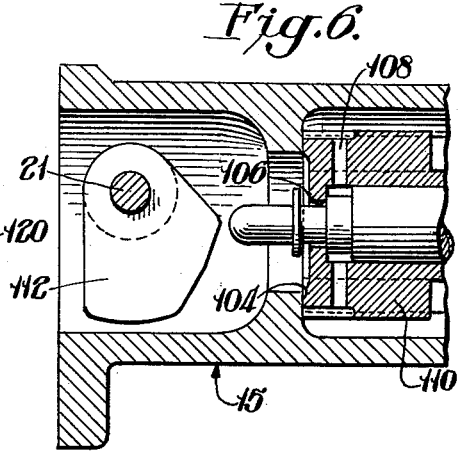
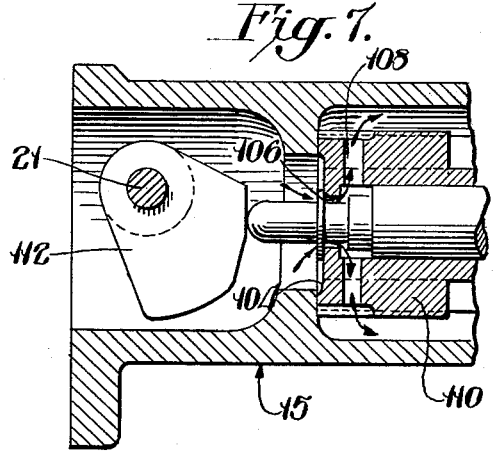
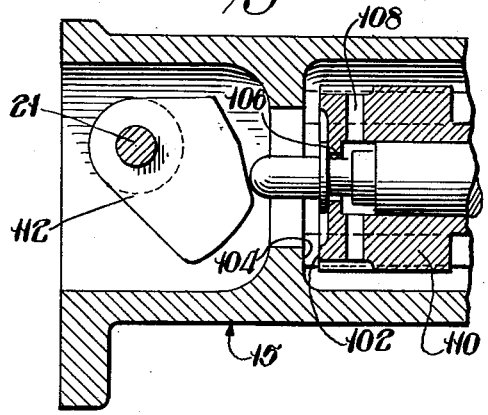
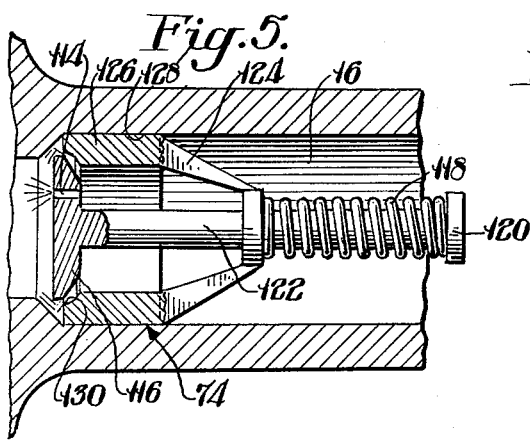
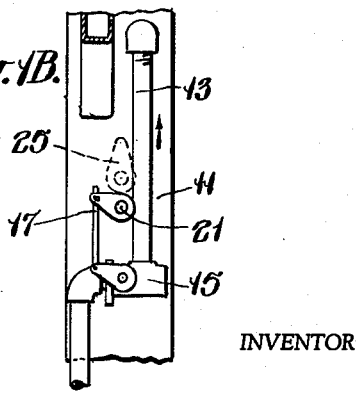
INVENTOR
*Robert Thomas Hearn*
BY *Connolly and Hutz*
ATTORNEYS United States Patent Office 3,166,108
Patented Jan. 19, 1965

3,166,108
AUTOMATIC SHUTOFF DEVICE
Robert Thomas Hearn, Willards, Md., assignor to Symington Wayne Corporation, Salisbury, Md., a corporation of Maryland
Filed July 18, 1961, Ser. No. 124,974
9 Claims. (Cl. 141—225)

This invention relates to an automatic shutoff valve for closing a fluid dispensing nozzle when the flow of fluid being supplied to it is cut off, and it more particularly relates to such a device for use in conjunction with a preset gasoline dispenser.

Nozzles that are capable of being latched open are highly convenient for use with preset dispensers, but they are quite liable to cause spillage by overflowing or misdirected discharge. Such misdirection is particularly liable to occur upon restoration of flow from a preset dispenser after an interruption. Automatic high level devices for tripping these nozzle latches, are quite common, and a novel automatic device which also trips the nozzle latch closed upon an interruption of flow is described in copending application for U.S. Letters Patent S.N. 32,667 filed May 31, 1960, now U.S. Patent 3,077,212 by this same inventor of which this present application is a continuation-in-part.

Preset dispensers usually operate at two rates of discharge including a high normal rate of flow during the major portion of the filling operation and at a reduced rate of flow more susceptible to precise control just prior to shut off. Since the aforementioned type of interrupted flow automatic nozzle shut off device is pressure actuated, the transition from normal to reduced flow rate is very likely to prematurely trip it closed.

An object of this invention is to provide a simple and economical pressure control arrangement for the aforementioned type of automatic shutoff valve which prevents premature closure when the rate of flow is suddenly and appreciably reduced.

In accordance with this invention a resiliently biased check valve is installed upon the downstream side of the pressure detecting conduit connected to the automatic valve for maintaining a predetermined minimum pressure under low flow rate conditions which is great enough to prevent premature closure of the automatic valve. A bypass passageway through the check valve has an area which facilitates the maintenance of the aforementioned predetermined minimum pressure even when the rate of fluid flow is suddenly and appreciably reduced by partial closure of the preset valve to its final retarded flow rate. This passageway is conveniently provided by a hole in the check valve disc, which in the normal range of gasoline dispensing flow is approximately four-ninths (4/9) of the area of the preset shutoff valve at its final retarded flow condition.

Novel features and advantages of the present invention will become apparent to one skilled in the art from a reading of the following description in conjunction with the accompanying drawings wherein similar reference characters refer to similar parts and in which:

FIG. 1B is a cross-sectional view taken through FIG. 1 along the line 1B—1B;

FIGS. 4 and 5 are enlarged cross-sectional views in elevation of a portion of the nozzle shown in FIGS. 2 and 3 in different operative conditions; and FIGS. 6–8 are enlarged cross-sectional views in elevation of the outlet portion of the preset shutoff valve shown in FIG. 1 in various phases of operation.

Figure 1:
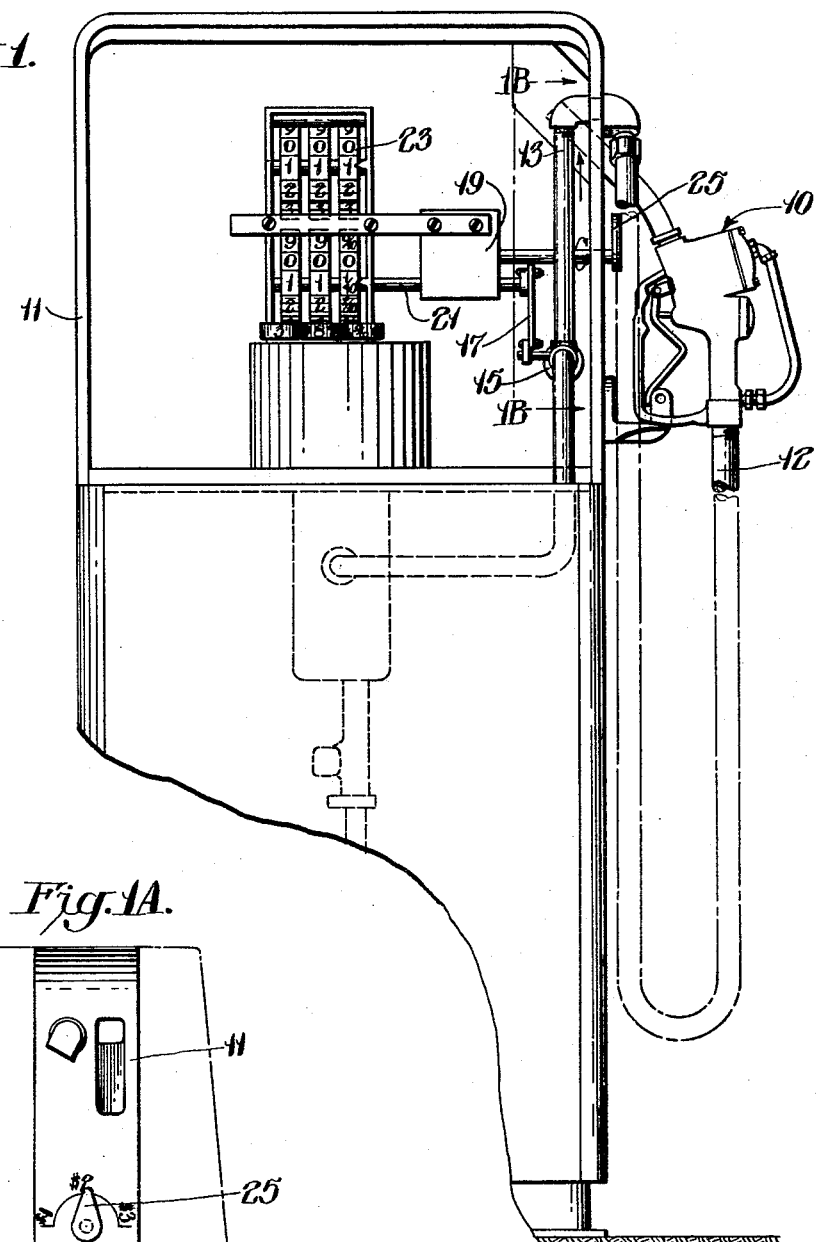
FIG. 1 is a front view in elevation of one embodiment of this invention connected to a preset gasoline dispenser.
Figure 1A:
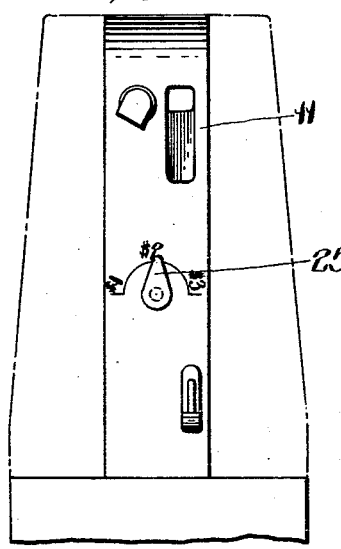
FIG. 1A is a side view in elevation of a portion of the dispenser shown in FIG. 1.

In FIG. 1 is shown nozzle 10 for dispensing gasoline from a dispensing pump 11 through a flexible hose 12. Hose 12 is connected to discharge piping 13 of dispenser 11 through a two-stage supply valve 15, which is actuated through a mechanical linkage 17 from a presettable mechanism 19. Valve 15 is, for example, of the type described and claimed in commonly assigned copending application S.N. 123,153 filed July 11, 1961. Presettable mechanism 19 is connected by mechanical linkage 21 to variator 23 of dispenser 11 which actuates presettable unit 19 to close valve 15 when a predetermined quantity of gasoline has been delivered. This quantity is preselected by adjustment of knob 25 upon dispenser 11 to automatically shut off the supply of gasoline after the selected preset quantity is delivered. Knob 25 may accordingly be adjusted to certain preselected numbers of gallons or money, such as $1.00, $2.00 or $3.00 amounts of gasoline as shown in FIG. 1A.

Figure 2:
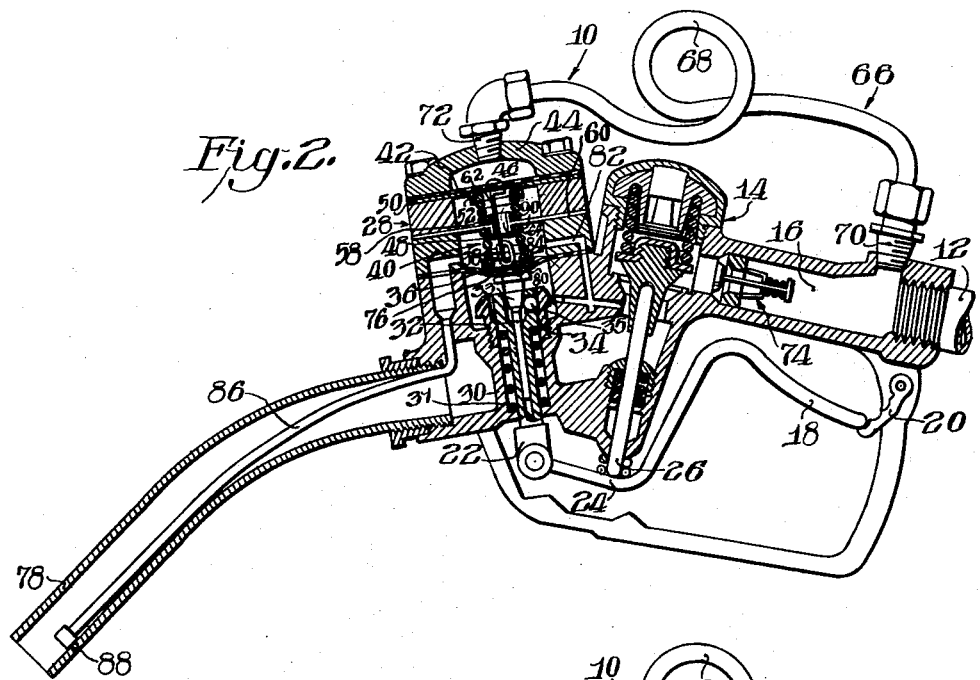
FIGS. 2–3 are cross-sectional views in elevation taken through the nozzle shown in FIG. 1 in various phases of operation.
Figure 3:
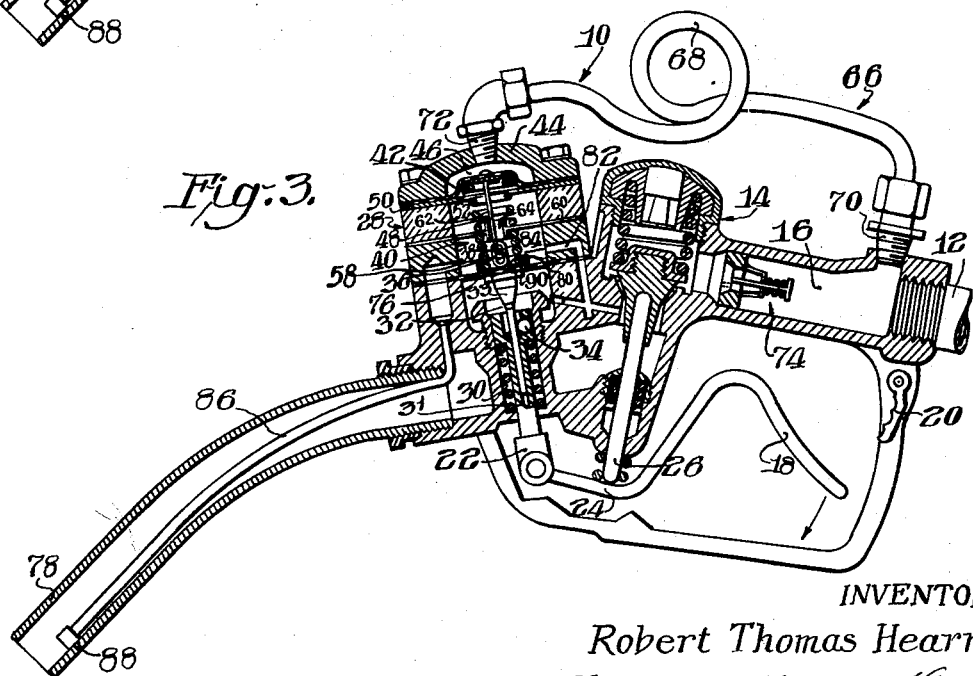

Nozzle 10 incorporates an automatic valve 14, shown in detail in FIGS. 2 and 3, which closes when the level of fluid rises in the tank being filled to submerge the nozzle tip 78 and end 88 of conduit 86 or when the supply of fluid to nozzle 10 is cut off. This respectively prevents a tank from being filled to overflowing or storage of the nozzle in a latched-open condition which would permit fluid to be spilled if supply valve 15 of dispenser 11 should open before nozzle 10 can be inserted into a tank.

When nozzle 10 is operated with a supply valve (not shown) which only provides a normal rate of flow, it operates as described in the following in a manner similar to that described in copending application S.N. 32,667, filed May 31, 1960 now U.S. Patent 3,077,212. Nozzle 10 as shown in FIGS. 2 and 3 includes a main flow valve 14 which controls the flow of fluid through passageway 16 and an operating lever or handle 18 which is detachably maintainable in the open position by a latching clip 20. This operating lever 18 is pivoted to a movable support rod 22, and it has a portion 24, which is disposed relatively close to the support rod, engaged with the operating stem 26 of main flow valve 14.

Referring to FIG. 2 in particular, nozzle 10 also includes a chamber 28 attached to the nozzle downstream of main flow valve 14, and support rod 22 is movably mounted to slide within a cylindrical cavity 30 disposed adjacent this chamber. A latching bar 32 maintains support rod 22 latched in the inserted position by the displacement of locking balls 34 by cone-shaped portion 33 of latching bar 32 over outer stationary shoulder 35. Connecting member 36 includes an elongated slot 38 extending into the hollow interior 40 of chamber 28. A flexible diaphragm 42 is also mounted within chamber 28, for example, by securing it under cap 44 to form a sealed space 46 between cap 44 and diaphragm 42. A link 48 couples the center portion of diaphragm 42 secured between disc 50 and dish 52 to connector 36 by extension of its horizontal arm 54 through slot 38. A resilient means 58, which is for example a compression spring of the coil type, reacts against diaphragm 42 through the inside of dish 52 in a direction to move latching bar 32 in a direction to disengage it from support rod 22. Coil spring 58 accordingly reacts against wall 60 secured within chamber 28. The vertical portion 62 of link 48 extends through a flanged opening 64 in wall 60.

A conduit 66 connects a portion of passageway 16 upstream of valve 14 with the space 46 in chamber 28; and it, for example, incorporates a tube 68 respectively connected to passageway 16 and space 46 by adapters 70 and 72. It is also possible to incorporate conduit 66 within the structure of nozzle 10 by casting suitable recesses.

The characteristics of coil spring 58 are chosen to allow the pressure applied to space 46 under normal flow conditions to overcome its force and permit support rod 22 to be retained by latching bar 32 in the open condition as long as a predetermined normal minimum fluid pressure supply is maintained. A differential check valve 74 is mounted between the point in passageway 16 to which conduit 66 is connected and main flow valve 14 to trap fluid within hose 12 when the fluid supply pressure is cut off or reaches a certain minimum with a diminished flow rate.

Nozzle 10 also includes an inner diaphragm 76 mounted within chamber 28 for closing valve 14 when the tip 78 of nozzle 10 is submerged. This heretofore existing type of shutoff is combined in nozzle 10 in an unexpectedly simple and economical manner with the aforementioned low supply shutoff as is now described in detail. Inner diaphragm 76 is also secured to latching bar 32 by an inverted dish 80, and the slot 38 in connector 36 permits latching bar 32 to move a predetermined distance independently away from outer diaphragm 42. A venturi passageway 82 connects space 84 of chamber 28 disposed between diaphragms 42 and 76 with a portion of fluid passageway 16 downstream of valve 14, and an open-ended conduit 86 connects the outer surface of nozzle tip 78 with space 84 to cause a reduced pressure to be created in space 84 when the open end 88 of conduit 86 is submerged. This reduced pressure acting against the force of spring 90, which reacts between wall 60 and inverted dish 80, moves latching bar 32 in a direction to allow locking balls 34 to disengage from shoulder 35 thereby releasing support rod 22 and allowing the main flow valve 14 to close. Slotted connector 36, therefore, permits main flow valve 14 to be closed either by submerging tip 78 of nozzle 10 or whenever the supply of fluid pressure drops below a predetermined minimum.

FIG. 2 shows nozzle 10 in the condition which exists when lever 18 engages valve 14 and is maintained in the open position by latching bar 32 and latching clip 20 under normal conditions of fluid flow. The fluid pressure in passageway 16 provided by the pump (not shown) is transmitted through conduit 66 into space 46 thereby forcing diaphragm 42 downwardly towards restraining wall 50. This wall 50 prevents diaphragm 42 from being strained beyond its elastic limit. In the downward position of diaphragm 42 latching bar 32 can be fully inserted within support rod 22 to cause cone 33 to displace balls 34 over shoulder 35 and maintain it latched in the dispensing condition shown in FIG. 2 in conjunction with latching clip 20 which engages the end of lever 18. As long as the opening 88 upon tip 78 remains open to atmosphere, air can be drawn through conduit 86, space 84 and venturi passageway 82 to prevent a reduced pressure from being created in space 84 and also maintaining inner diaphragm 76 down to permit main flow valve 14 to remain open to continue dispensing fluid.

FIG. 3 shows what occurs when the fluid supply pressure in passageway 16 drops below a predetermined minimum to reduce the pressure in space 46 thereby allowing the force of spring 58 to force diaphragm 42 upward and away from support rod 22 and act through link 48 and connector 36 to latching bar 32 from support rod 22 and balls 34 allowing the end of lever 18 to jump out of latching clip 20 and resiliently biased main flow valve 14 to close. Spring 58, and space 46 may, for example, be selected to cause upward movement of diaphragm 42 when the pressure in passageway 16 drops, for example, to two or three p.s.i. Differential check valve 74 can be set to subsequently close at even lower differential pressures. Main flow valve 14, therefore, closes at any time that the fluid supply drops below a predetermined minimum to prevent accidental discharge through the nozzle if the supply should be restored.

When the valve is in the shutoff position before it is opened by an operator into, for example, the dispensing condition shown in FIG. 2, main flow valve 14 normally traps sufficient pressure in passageway 16 when it closes to maintain diaphragm 42 in the position shown in FIG. 2 to maintain nozzle 10 in readiness for immediate opening as long as full supply pressure is maintained in passageway 16. Spring 31 maintains support rod 22 moved toward latching bar 32 to engage balls 34 with cone 33 and lock them and support rod 22 over shoulders 35. However, should the pressure in passageway 16 fall below the predetermined minimum because of a supply failure, spring 58 forces diaphragm 42 upwardly to release latching bar 32 from support rod 22 and prevent opening of valve 14.

When liquid level rises above opening 88 in the tip 78 of nozzle 10, this prevents air from entering suction conduit 86; and causes a reduced pressure or vacuum to be created in space 84 as a result of the removal of air through venturi passageway 82. This reduced pressure moves diaphragm 76 upwardly from the dispensing condition shown in FIG. 2 thereby pulling latching bar 32 upwardly which allows balls 34 to disengage from shoulder 35 to allow support rod 22 to be forced down by resiliently braced main flow valve 14 to trip handle or lever 18 out of engagement with latching clip 20 and allow valve 14 to close. This illustrates how nozzle 10 automatically closes whenever the liquid level in a tank being filled thereby rises above the tip of nozzle 10.

FIGS. 4 and 5 illustrate the features of nozzle 10, which prevent it from being prematurely tripped closed when preset valve 15 suddenly partially closes to its low flow rate condition as shown in FIGS. 6–8. In FIG. 4 check valve 74 is shown in the fully seated condition, which it probably assumes at the time that preset valve 15 assumes the partially open condition shown in FIG. 7. At this time the flow through preset valve 15 is appreciably reduced from the condition of FIG. 8 by closure of main valve element 102 against main seat 104 which causes the flow to be channelled at a relatively low rate through central aperture 106 and radial passageway 108 in main valve element 110.

FIG. 8 shows the condition of valve 15 at normal rates of flow, such as fourteen to fifteen g.p.m. at a pressure of approximately fifteen to twenty p.s.i., which is provided by the illustrated position to which actuating cam 112 is adjusted by linkage shaft 21.

FIG. 7 shows the final or partially-open position of valve 15 to which cam 112 abruptly adjusts it by movement of linkage 21; and FIG. 6 shows the fully shutoff condition of valve 15.

In FIGS. 4 and 5 is shown bypass passageway 114 in disc 116 of check valve 74, which is resiliently biased into the closed condition by compression spring 118 reacting between head 120 on the end of valve shaft 122 and cage 124 within which check valve shaft 122 slides back and forth. Cage 124 is secured to check valve seat 126 which is snugly inserted within the inner surface 128 of the supply portion or passageway 16 of nozzle 10.

Hole 114, for reasons which are not absolutely understood, facilitates the maintenance of a predetermined minimum pressure in passageway 16 when the rate of fluid flow is suddenly and appreciably reduced by partial closure of supply valve 15 as shown in FIG. 7. This minimum pressure is effectively maintained under normal condition of flow in gasoline dispensers of the preset type when the area of bypass passageway hole 114 in check valve 74 is approximately four-ninths ($4/9$) of the low flow rate area of supply shutoff valve 15. When, for example, the low flow rate area of valve 15 is substantially equal to that of a circular passageway having a $3/32$ inch diameter, bypass passageway 114 will operate effectively when it is approximately $1/16$ inch in diameter within a tolerance of approximately 0.005 inch above and below. Such an arrangement will, for example, maintain a pressure in passageway 16 above a minimum predetermined pressure range of, for example, two to three p.s.i. at flow rates as low as one g.p.m. This low flow rate is usually approximately two g.p.m. in contrast to a normal flow rate of from fifteen to twenty g.p.m.

Although it would appear that hole 114 in disc 116 would interfere with the maintenance of adequate pressure in passageway 16, it has been proven that such an orifice actually helps maintain a predetermined minimum pressure ranging from two to three p.s.i., which prevents premature closure of valve 14 upon the sudden and appreciable drop in flow rate occasioned by the preliminary closure of valve 15 from the fully open condition shown in FIG. 8 to the partially open condition shown in FIG. 7. One reason for this prevention of premature tripping of nozzle 10 may be the facilitation of closure of check valve 74 or the avoidance of the necessity to remove disc 116 very far from its seat 130 to pass the small amount of flow, as shown in FIG. 5. If the low rate of flow into passageway 16 is great enough to create enough pressure to force disc 116 off seat 130, the condition shown in FIG. 5 with a slight flow around the periphery of disc 116 will exist under these low flow rate conditions. However, if orifice 114 will pass the low rate of flow without building up enough pressure to force disc 116 off seat 130, the closed condition of disc 116 shown in FIG. 4 will persist in check valve 74 under low flow rate condition. In either event the presence of passageway 114 will maintain the predetermined pressure in passageway 16 to prevent nozzle 10 from prematurely tripping shut when the flow rate is suddenly retarded, whereas that undesirable phenomenon is likely to occur should hole 114 not be provided.

What is claimed is:

1. A pressure control arrangement comprising a fluid dispensing nozzle, a fluid supply source, a conduit connecting said nozzle to said fluid supply source, a supply shutoff valve installed between said conduit and said fluid supply source, said supply shutoff valve being operable to provide normal and minimal flow areas for normal and minimal flow therethrough, an automatic shutoff valve in said nozzle which closes said nozzle when the flow of fluid supplied to it is cut off, a check valve in said nozzle between said automatic shutoff valve and said supply shutoff valve for preventing premature closure of said automatic valve, a pressure detecting conduit connecting said automatic valve to a portion of said nozzle between said check valve and said supply shutoff valve for actuating said automatic valve to close when the pressure in said portion of said nozzle drops below a predetermined minimum pressure, resilient means urging said check valve to close when the fluid supply pressure approaches said predetermined minimum pressure for maintaining said predetermined minimum pressure under said minimal flow rate conditions in said portion of said nozzle, and a restricted bypass passageway through said check valve of an area which facilitates the maintenance of said predetermined minimum pressure in said portion of said nozzle when the rate of fluid flow is suddenly and appreciably reduced.

2. A pressure control arrangement as set forth in claim 1 wherein said check valve includes a disc, and said passageway comprises a hole through said disc.

3. A pressure control arrangement as set forth in claim 2 wherein said hole is approximately 1/16 of an inch in diameter.

4. A pressure control arrangement as set forth in claim 1 wherein the area of said bypass passageway in said check valve is approximately four-ninths (4/9) said minimal area of said supply shutoff valve.

5. A pressure control arrangement as set forth in claim 4 wherein the said minimal area of said supply shutoff valve is substantially equal to that of a circle having a 3/32 inch diameter, and said bypass passageway having an area substantially equal to that of a circle having a 1/16 inch diameter.

6. A pressure control arrangement as set forth in claim 5 wherein said 1/16 inch diameter hole in said valve disc is maintained to that dimension within approximately 0.005 inch.

7. A pressure control arrangement as set forth in claim 4 wherein the normal flow area of said supply shutoff valve is arranged to pass approximately 15 g.p.m. at a pressure ranging approximately from 15 to 20 p.s.i., said minimal area of said supply shutoff valve being sufficient to pass a minimal flow rate ranging approximately from 1 to 2 g.p.m., and said check valve and said bypass passageway being arranged to maintain a pressure ranging approximately above 1 p.s.i. in said portion of said nozzle.

8. A pressure control arrangement as set forth in claim 7 wherein said bypass passageway has an area approximately equal to that of a 1/16 inch diameter circle.

9. A pressure control arrangement as set forth in claim 8 wherein said minimal area of said supply shutoff valve is approximately equal to that of a circle having a 3/32 inch diameter.

References Cited in the file of this patent

UNITED STATES PATENTS

| 2,302,766 | Grise | Nov. 24, 1942 |
| 2,681,073 | Fraser | June 15, 1954 |
| 2,997,207 | Bolkin | Aug. 22, 1961 |

FOREIGN PATENTS

| 943,916 | France | Mar. 22, 1949 |